(12) United States Patent
Hand

(10) Patent No.: US 8,641,002 B2
(45) Date of Patent: Feb. 4, 2014

(54) TOWER MOUNTING APPARATUS

(76) Inventor: Art Hand, Huntington, WV (US)

(*) Notice: Subject to any disclaimer, the term of this patent is extended or adjusted under 35 U.S.C. 154(b) by 447 days.

(21) Appl. No.: 13/112,183

(22) Filed: May 20, 2011

(65) Prior Publication Data
US 2012/0291833 A1 Nov. 22, 2012

(51) Int. Cl.
E04G 3/00 (2006.01)

(52) U.S. Cl.
USPC .............................. 248/230.1; 343/890; 52/40

(58) Field of Classification Search
USPC ................ 248/230.1, 201; 290/44, 55; 52/40; 343/890
See application file for complete search history.

(56) References Cited

U.S. PATENT DOCUMENTS

| 5,467,955 | A | * | 11/1995 | Beyersmith | 248/219.3 |
|---|---|---|---|---|---|
| 5,787,673 | A | * | 8/1998 | Noble | 52/848 |
| 5,954,305 | A | * | 9/1999 | Calabro | 248/219.4 |
| 6,028,566 | A | * | 2/2000 | Pennell et al. | 343/878 |
| 6,052,092 | A | | 4/2000 | Davis et al. | |
| 6,232,928 | B1 | | 5/2001 | Zimmerman et al. | |
| 6,290,195 | B1 | | 9/2001 | Deuer | |
| 6,563,475 | B2 | * | 5/2003 | Ianello et al. | 343/890 |
| 6,710,751 | B2 | * | 3/2004 | Ianello et al. | 343/890 |
| 7,106,273 | B1 | | 9/2006 | Brunson et al. | |
| 7,113,145 | B1 | | 9/2006 | Noble | |
| 7,138,961 | B2 | | 11/2006 | Sievert | |
| 7,321,340 | B1 | | 1/2008 | Sergi et al. | |
| 7,339,549 | B2 | | 3/2008 | Maxwell | |
| 7,432,875 | B1 | | 10/2008 | Sergi | |
| 7,576,705 | B2 | | 8/2009 | Greenfield et al. | |
| 7,616,170 | B2 | | 11/2009 | Renfro et al. | |
| 7,642,988 | B1 | | 1/2010 | Johnson et al. | |
| 8,201,787 | B2 | * | 6/2012 | Ingram et al. | 248/218.4 |
| 2005/0230980 | A1 | | 10/2005 | Brunet | |
| 2009/0092449 | A1 | | 4/2009 | Sveen | |
| 2010/0005656 | A1 | | 1/2010 | Vangsy | |
| 2010/0150684 | A1 | | 6/2010 | Pedersen et al. | |
| 2012/0291833 | A1 | * | 11/2012 | Hand | 136/244 |

OTHER PUBLICATIONS

Craig Rubens, Ericsson Unveils Wind-Powered Cell Tower, The GigaOM Network, Oct. 9, 2008, http://gigaom.com/cleantech/ericsson-unveils-wind-powered-cell-tower-1/ (last accessed: May 16, 2011).

Keith Whitcomb Jr., Pownal family pleased with wind turbine/cell tower, Nov. 7, 2008, http://pownal.pbworks.com/f/1wind+turbine.pdf (last accessed: May 16, 2011).

* cited by examiner

Primary Examiner — Katherine Mitchell
Assistant Examiner — Scott Denion
(74) Attorney, Agent, or Firm — Robert R. Waters; Brian W. Foxworthy; Waters Law Group, PLLC

(57) ABSTRACT

A tower mounting apparatus consists of tower mounting brackets, track members, a roller assembly, platform mounting brackets, and platform members. The tower mounting brackets are attached to a tower at a first interface, and are attached to the track members at a second interface. The roller assemblies are attached to the platform mounting brackets at a first interface, while the platform members are attached to the platform mounting brackets at a second interface. The roller assemblies are designed to rotate freely over the track members. One or more devices—such as a wind turbine, a cellular communication system, a transmitter/receiver for radio or television signals, or solar arrays—may be mounted onto the platform. The apparatus may further comprise a slip-ring assembly that provides a continuous electrical connection to such devices. The platform mounting apparatus may be installed on a variety of different towers.

21 Claims, 11 Drawing Sheets

TOWER MOUNTING APPARATUS

BACKGROUND OF THE INVENTION (a) Technical Field of the Invention

This invention relates generally to a method and apparatus for mounting a utility device or system onto existing or new towers. Such devices or systems may include a wind power generation system, a cellular communication system, or a system that receives, transmits or transfers radio or television signals, or other system.

The advantage of this invention is that it allows such devices or systems to be mounted onto an existing tower.

In one embodiment, this invention allows a wind turbine system to be mounted onto an existing cellular communication tower, or a radio and television transmission tower. This localizes the generation of wind power, and reduces the per capita cost of generation. In particular, it facilitates the mounting of wind turbine generation systems onto remote communication towers at a very low cost. The apparatus in this invention also allows other digital communication antennae to be mounted onto an existing tower.

(b) Description of the Relevant Art

The pursuit of renewable and sustainable energy sources is of utmost importance to the survival of our civilization. Recent global events, like the turmoil in the middle east and the leak at the nuclear power plants in Japan, in the aftermath of the earthquake and tsunami, underscore the immediate need for inexpensive means to generate power locally.

Wind power has been the fastest-growing source of new electric power generation for several years. According to the Department of Energy, wind power generation in 2009 was up 33.5 percent over the prior year. The 2005 Energy Policy Act provided interest-free financing via Clean Renewable Energy Bonds to government entities investing in wind. Farmers, ranchers and other rural businesses have also been benefited by the grant and loan guarantee provisions for wind projects, in Section 9006, under Title IX of the 2002 and 2008 Farm Bills. Several states provide incentives for projects involving renewable sources of energy, including wind projects. A listing of such incentives is available at the Database of State Incentives for Renewables and Efficiency (http://www.dsire-usa.org/index.cfm?EE=0&RE=1).

Antenna poles or towers have been used for a long time now. These towers are generally used to transmit, receive and forward radio and television signals. Recently, with the increase in cellular communication, microwave towers have proliferated on the landscape, even in rural areas. Such poles or towers range in height from 80 to 220 feet or more.

Wind turbines are a clean and green alternative to coal and nuclear power plants. These turbines are mounted at higher elevations or on top of towers because that is where the average wind speed is high. This is important since the power generated by a wind turbine is roughly proportional to the cube of the average wind speed.

One of the major drawbacks of using wind turbines is the installation cost of a tower to support such an apparatus. This cost is large enough to reduce the overall efficacy and cost-effectiveness of using this alternate form of energy.

Another drawback is that large-scale wind power generation requires a large number of wind towers, with large wind turbines, which subsequently requires a large tract of land. The cost of setting up such farms, including the cost of leasing large tracts of land, again reduces the overall efficacy and cost-effectiveness of using this alternate form of energy.

Therefore, there is a need to make the generation of wind power less expensive. Since the cost of installing towers is a substantial deterrent, there is a need to have an apparatus that allows wind turbines to be mounted onto existing towers. Also, instead of large wind farms, it may be more economical to generate power off-grid for smaller communities. Since cellular communication towers and towers for the transmission of radio and television signals are widespread throughout the landscape, including rural landscapes, it is desirable to mount wind turbines onto such existing towers. It should be noted that the general concept for combining wind turbine towers and cellular antenna is well known in the art.

An apparatus that modifies existing wind towers to also accommodate communications functionality is disclosed in U.S. Pat. No. 7,138,961 by Sievert. In this invention, the wind tower design is largely unchanged. However, there is an optional add-on feature that is able to operate as, or contain the functionality of, a communications tower. The focus of the discussion of Sievert's invention relates to cellular signal transmission.

A wind turbine for a power transmission tower is disclosed in U.S. Patent Application Publication No. 2005/0230980 by Brunet. This invention relates to an improved wind turbine that may be installed onto an existing power grid infrastructure. The focus of this invention is more on weaning off the power generated by a wind turbine directly to an existing power grid.

The construction of an antenna tower and a method to couple an antenna array to a tower is disclosed in U.S. Pat. No. 7,576,705 by Greenfield et al. The antenna mounting apparatus is fastened onto the poles of a three-pole, lattice-type tower.

An antenna platform and a mounting apparatus for rotatably mounting the antenna platform to the tower is disclosed in U.S. Pat. No. 6,710,751 by Ianello et al. This invention allows the antenna platform to rotate about a lattice tower. The rotational mechanism overcomes the difficulty imposed by the triangular shape of the lattice tower. The platform itself has a triangular shape, and sits on a ring that facilitates the rotational movement. Although the platform may be set at any desired position about a 360-degree azimuth, the platform's rotation is restricted to at most a 120-degree arc.

While such a limited range of rotation may suffice for cellular communication signals, this design is not compatible with the functioning of a wind turbine. Wind may travel in any direction. Therefore, it is desirable to design a platform that is capable of rotating the entire 360-degrees, to facilitate the movement of the rotary blades of a wind turbine with respect to wind blowing in different directions. Moreover, the design should also facilitate ease of rotation.

An antenna mounting platform for a monopole tower is described in U.S. Pat. No. 5,467,955 by Beyersmith. The essential feature of this invention is that it allows brackets to be releasably mounted along the length of a monopole at any desired height.

In U.S. Pat. No. 6,052,092, Davis et al. describe a platform for a wireless telecommunication antenna. The platform is mounted at the top of an electric power transmission tower. Although the platform may be rotatably adjusted by using a nut and bolt configuration, the platform itself remains stationary while in use.

While all the inventions mentioned above are directed at various apparatus that support the multiple use of towers, they fail to overcome the substantial technical hurdles of the prior art. Providing flexibility in the range of rotation allows the use of a single tower for multiple purposes. The present invention provides such capability.

The present invention provides one or more platforms that may be mounted onto already existing towers. These platforms may rotate about the longitudinal axis of the tower, up to the full 360-degree range. Moreover, these platforms may support a variety of devices or systems, including wind turbines, cellular communication antennae, and other devices to receive, transmit or transfer radio and television signals. The rotation itself is very smooth, facilitating easy movement of the platform in response to the wind direction. Finally, this invention allows for a continuous and uninterrupted electrical connection between the rotating unit of the device and the stationary unit of the device. In the case of a wind power generation system, the rotating unit would be a wind turbine, while the stationary unit could be a generator. In the case of a cellular transmission system, or a radio and television signal transmission or receiving system, the rotating unit would be an antenna and the stationary unit could be a signal transmitter or receiver.

SUMMARY OF THE INVENTION

The present invention provides a novel solution to the problems mentioned above.

The present invention provides one or more platforms that may be mounted onto, towers, including pre-existing towers. These platforms may rotate about the longitudinal axis of the tower, up to the full 360-degree range.

The rotational movement of the roller assembly is very smooth, facilitating easy movement of the platform in response to the wind direction, or the direction of an appropriate signal.

The invention facilitates mounting wind turbines and, or antennas onto these rotatable platforms.

The invention also provides a continuous and uninterrupted electrical connection between the rotating and stationary units of the device.

One embodiment of the invention is to mount a small wind turbine onto a pre-existing tower. The turbine is mounted onto a platform which is allowed to rotate through a 360-degree angle. This allows the rotors of the turbine to respond to variable wind directions. A continuous and uninterrupted electrical connection allows the rotational movement generated by the wind to be continuously transferred to a generator, leading to a continuous power supply. Towers, such as cellular communication towers, dot the rural landscape. By eliminating the need for a separate and expensive wind tower, this apparatus facilitates the generation of wind power at a substantially lower cost, providing a clean and environment-friendly alternate source of power to communities in far-flung areas.

Another embodiment of the invention is to mount a cellular communication system onto a pre-existing tower.

Yet another embodiment of the invention is to mount multiple wind turbines, or multiple cellular communication systems, or a combination of one or more of these devices along with other appropriate devices onto a single pre-existing tower.

These and other features, variations and advantages which characterize this invention, will be apparent to those skilled in the art, from a reading of the following detailed description and a review of the associated drawings.

All features and advantages of this invention will be understood from the detailed descriptions provided. This description, however, is not meant to limit the embodiments, and merely serves the purpose of describing certain embodiments in detail.

BRIEF DESCRIPTION OF THE DRAWINGS

A better understanding of the present invention will be had upon reference to the following description in conjunction with the accompanying drawings, wherein.

DETAILED DESCRIPTION OF EMBODIMENTS

While the invention will be described in connection with certain embodiments, there is no intent to limit it to these embodiments. On the contrary, the intent is to cover all alternatives, modifications and equivalents as included within the spirit and scope of the invention. Various changes may be made to the function and arrangement of the elements described herein, without changing the scope of the invention being disclosed. It should be noted that the following description serves to teach at least one instance of how the various elements may be arranged to achieve the stated goals of this invention.

Figure 1:
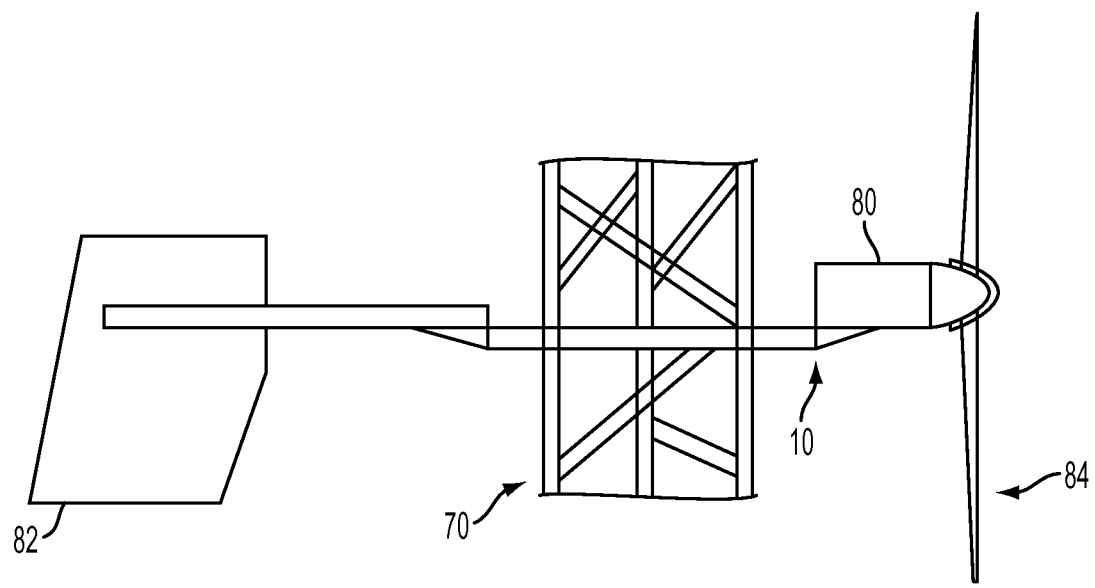
FIG. 1 is a schematic diagram of a tower with the mounting apparatus and a wind turbine.

Referring to FIG. 1, a schematic view is presented of the mounting apparatus 10 installed onto a pre-existing tower 70. Although the tower is depicted as a lattice-pole tower, any other tower may be substituted. The figure shows how a device or system 80 may be mounted onto the mounting apparatus 10. For illustrative purposes only, the device shown here is a wind turbine with blades 84 and a tail 82.

Figure 2:
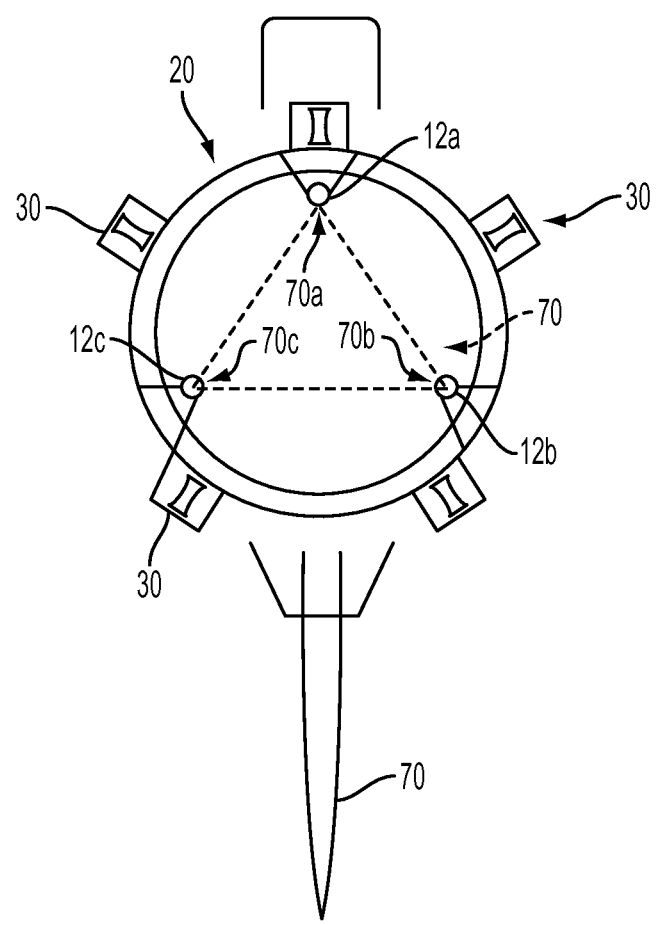
FIG. 2 is a top view showing the tower, the mounting brackets, a track, and the platform mounting brackets.

FIG. 2 is a top view showing the tower 70 with three legs 70a, 70b, and 70c. Three tower mounting brackets, 12a, 12b, and 12c, are also shown. Each mounting bracket is attached to a tower leg. Thus, mounting bracket 12a is attached to tower leg 70a, mounting bracket 12b is attached to tower leg 70b, and mounting bracket 12c is attached to tower leg 70c. A circular track 20 is shown fixed onto the mounting brackets 12a, 12b, and 12c. Finally, platform mounting brackets 30 are attached to track 20. It should be noted that a tower with three legs is shown merely for the purpose of describing one embodiment of this invention in sufficient detail. Lattice-type and monopole towers may be used. Moreover, floatable towers are also included within the scope of this invention. Here, floatable is used to describe any tower set-up that is installed onto a platform that can float in a water body, such as lakes, rivers, seas, oceans, etc., or the tower itself is designed to float. Similarly, a circular track is shown only to describe and enable one embodiment. Other tracks may be used.

Figure 3:
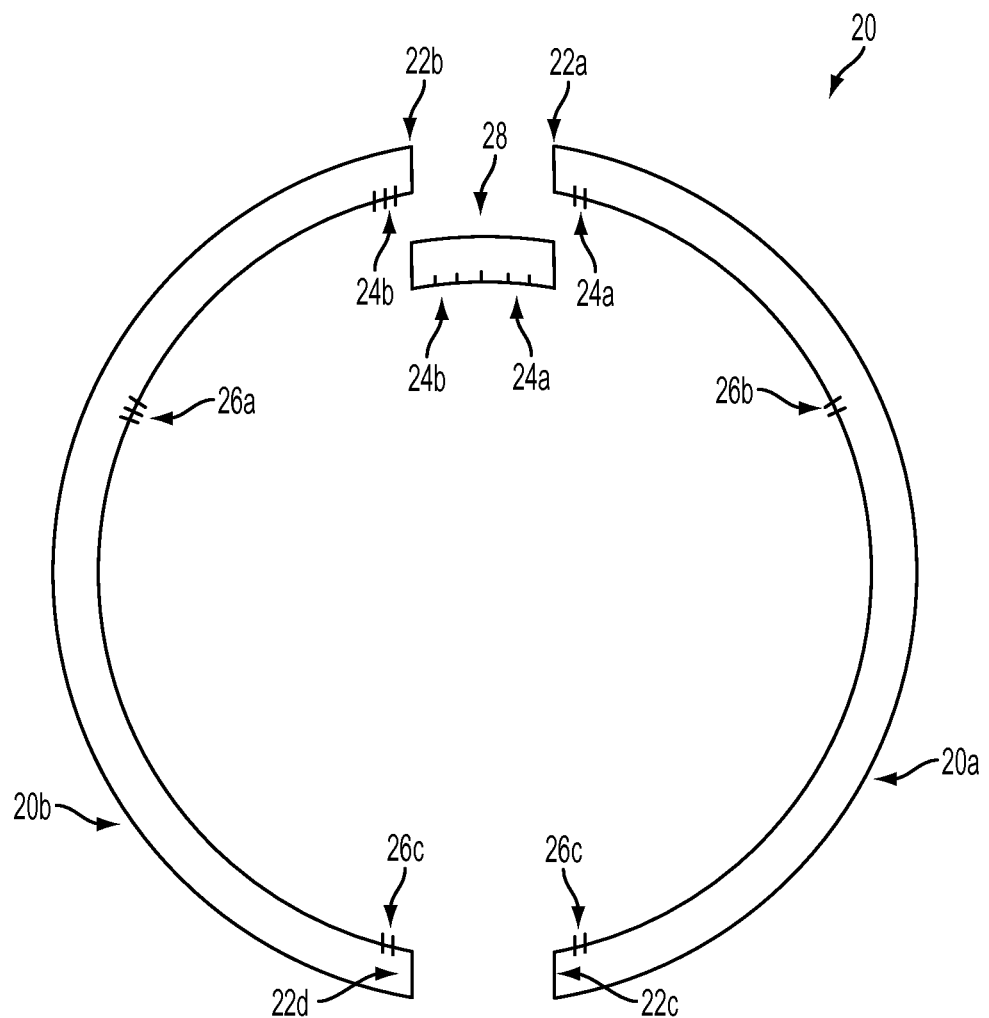
FIG. 3 shows track members with an alignment stub. In this figure, two track members are shown with one alignment stub.

FIG. 3 describes how a track 20 may be installed onto a pre-existing tower. The track 20 may comprise two or more members. Here, the track comprises two track members 20a and 20b. Track member 20a comprises two ends 22a and 22c, while track member 20b comprises two ends 22b and 22d. In this particular embodiment, we will show how a single track may be obtained by connecting the track members 20a and 20b. This is achieved by connecting the ends 22a and 22b, and similarly connecting the ends 22c and 22d. Alignment is very important in order to achieve a smooth and continuous track. Such alignment may be easily achieved with the use of an alignment stub 28. The figure depicts alignment stub 28 close to the ends 22a and 22b. Alignment is achieved by using two pairs of pre-drilled holes: a pair of pre-drilled holes 24a in track member 20a and the alignment stub 28, and another pair of pre-drilled holes 24b in track member 20b and the alignment stub 28.

It should be noted that a track with two segments is shown here for illustrative purposes only. Depending on the tower, more track segments may be needed, and correspondingly, we may need additional alignment stubs. For instance, with three track segments, we will have three splices, and we may obtain a single, circular track using two alignment stubs.

Figure 7:
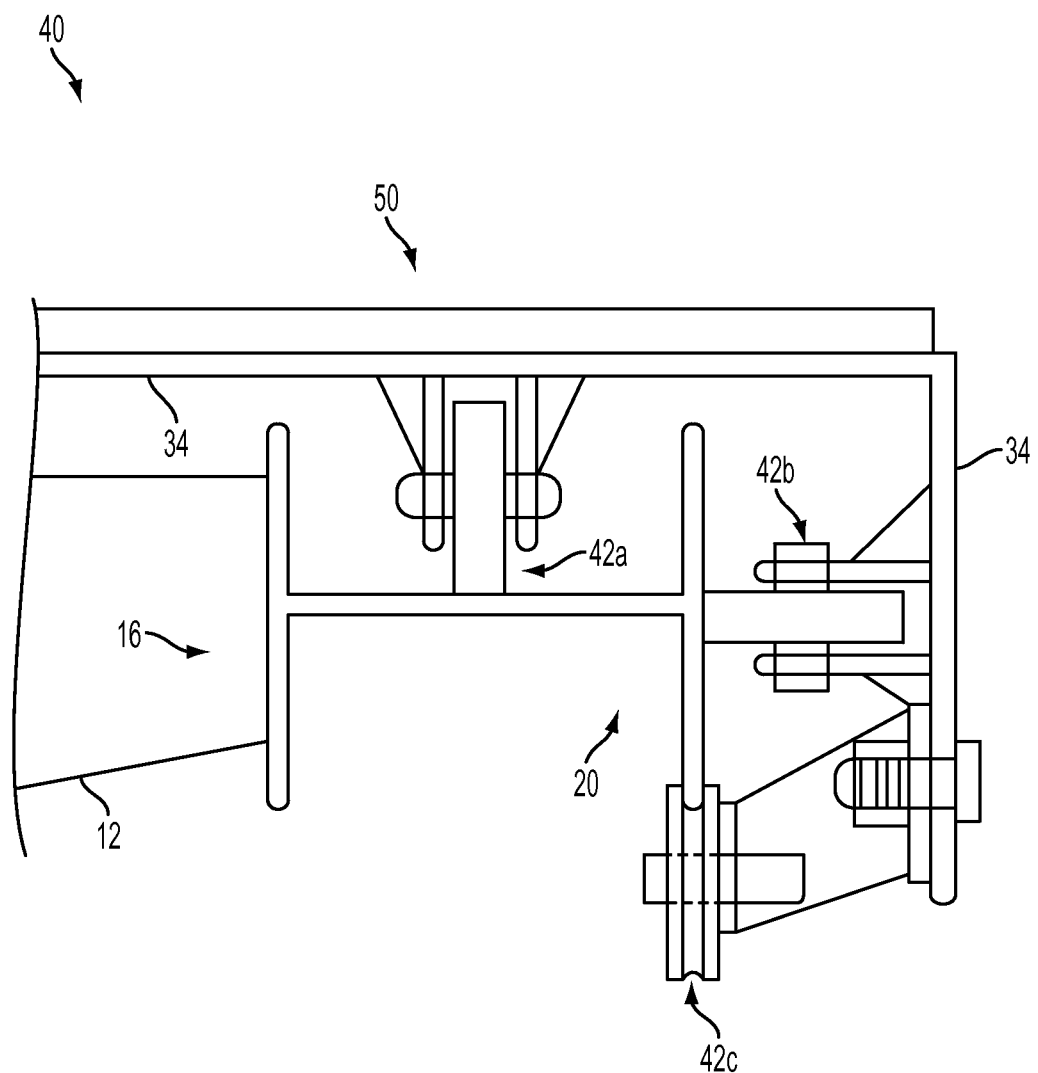
FIG. 7 shows a cross-section of another embodiment of a roller assembly on an "H" or "I" track.

It should also be noted that the track may have a variety of shapes and cross-sections depending on the circumstances. Typical embodiments of the track could include a circular or elliptical shape with a circular or rectangular cross-section. The track could have an annular "I" or "H" shaped cross-section. The choice would depend on the preferred type of roller assembly, which in turn would depend on the type of device that is to be mounted, and the geographic placement of the tower. For instance, in places with very high wind velocity, or places that have frequent changes in wind direction, a highly stable mounting platform and a smooth rotation would be necessary. To achieve this, the roller assembly and the track may be suitable adjusted. One such embodiment is shown in FIG. 7 and will be described below.

FIG. 3 also shows how holes may be pre-drilled onto the track segments to facilitate the attachment of the tower mounting brackets. In the case of a tower with three legs, there will be three tower mounting brackets, and three sets of pre-drilled holes, 26a, 26b, and 26c.

Figure 4:
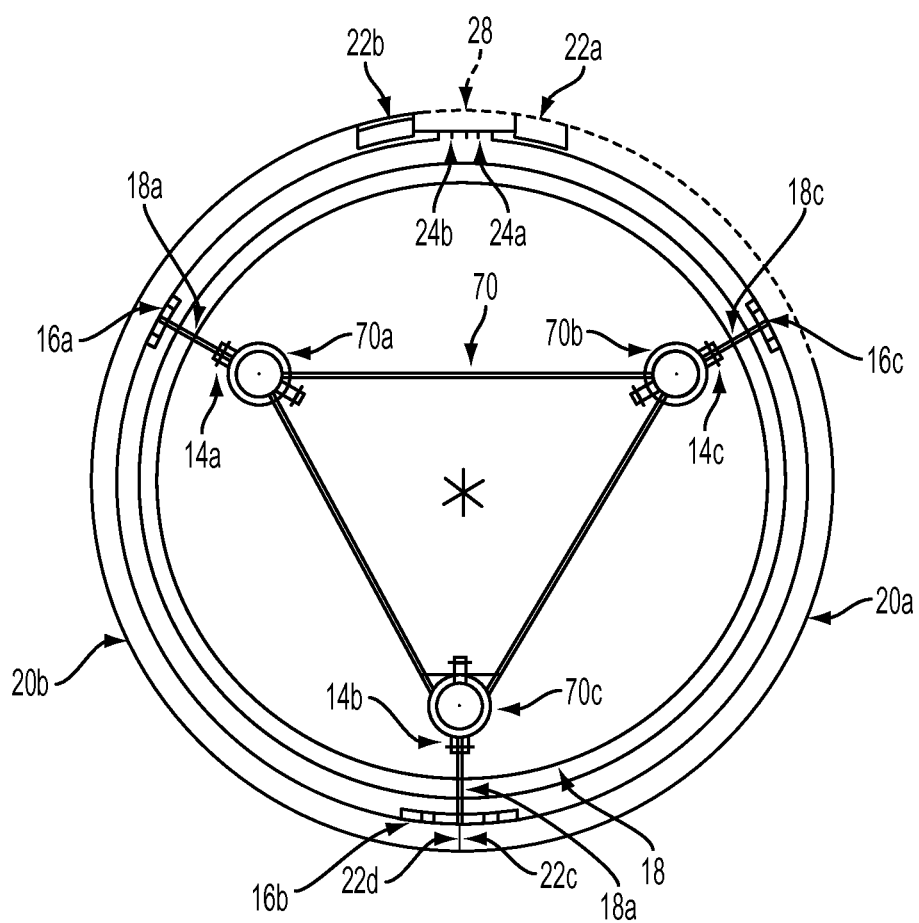
FIG. 4 is another top view showing the track members joined together using the alignment stub.

FIG. 4 is a top view showing the tower 70 with three legs 70a, 70b, and 70c. This figure is a detailed view showing the relative attachments of the tower legs, the tower mounting brackets, the track members, and possibly a slip-ring track. The track segments 20a and 20b of FIG. 3 are now joined together using the alignment stub 28. Thus ends 22a and 22b of track member 20a and 20b are respectively joined together. The alignment stub 28 is inserted into the hollow interior and pre-dilled holes 24a and 24b are screwed together. This enables the ends 22c and 22d of track member 20a and 20b respectively to join snugly together. If required, an additional alignment stub may be used at these ends to enable a better fit.

The three tower mounting brackets, 12a, 12b, and 12c, of FIG. 2, have two interfaces each. The first interface 14a of bracket 12a is secured to leg 70a of tower 70. This may be done using screws and pre-drilled holes. Similarly, the first interface 14b of bracket 12b is secured to leg 70b, and the first interface 14c of bracket 12c is secured to leg 70c.

The second interface of each tower mounting bracket is fixedly attached to the track members. Thus the second interface 16a of bracket 12a is secured to the track using the pre-drilled holes 26a shown in FIG. 3. Similarly, the second interface 16b of bracket 12b is secured to the track using the pre-drilled holes 26b, and the second interface 16c of bracket 12c is secured to the track using the pre-drilled holes 26c.

A slip ring contact is typically used for a continuous electrical connection between a rotational component and a stationary component. While such a contact may be established in a variety of ways that are well known in the art, FIG. 4 depicts one way this may be done in an embodiment of the present invention. A circular slip ring stationary track 18 is shown. It may be attached to the tower mounting brackets. Thus it may be attached to bracket 12a at interface 18a, to bracket 12b at interface 18b, and to bracket 12c at interface 18c.

Figure 5:
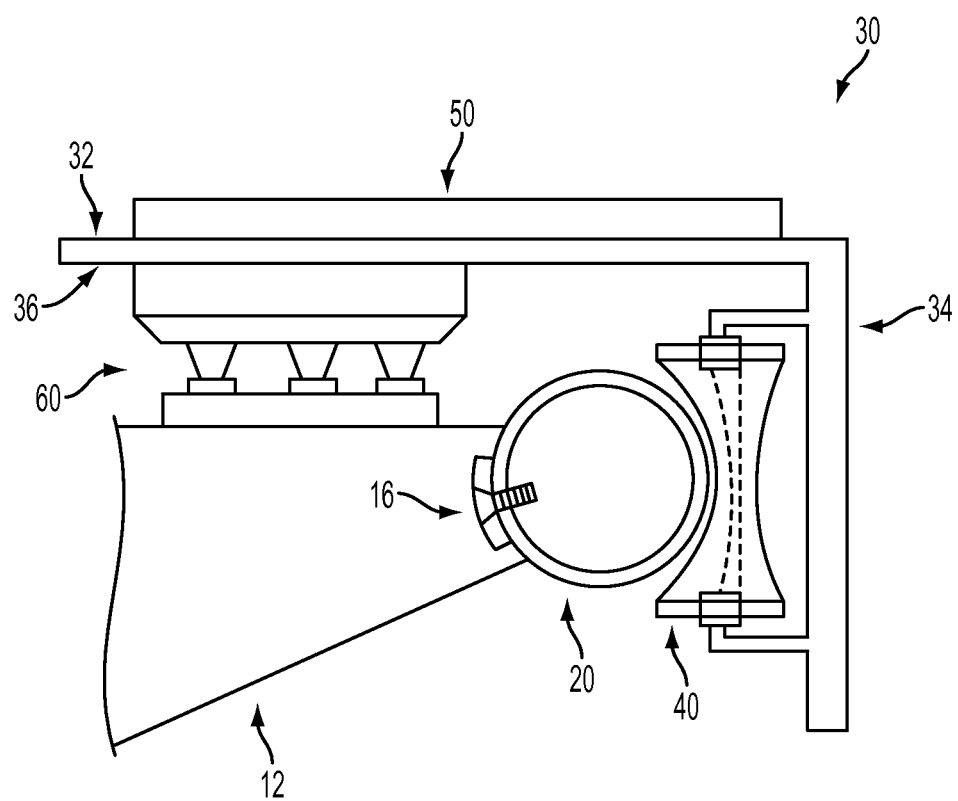
FIG. 5 is a schematic view of the tower mounting apparatus showing the relative positions of the main components with respect to a platform mounting bracket.

FIG. 5 is a cross-sectional view of the platform mounting brackets, the roller assembly and the slip ring assembly. A circular cross-section of track 20 is shown. The first interface 16 of the tower mounting bracket 12 is fixed to track 20. A roller assembly 40 is used to facilitate rotational movement over track 20. The platform mounting bracket 30 has multiple interfaces. The platform 50 is attached to interface 32, the roller assembly 40 is attached to interface 34, while the slip ring assembly 60 may be attached to interface 36.

Figure 6:
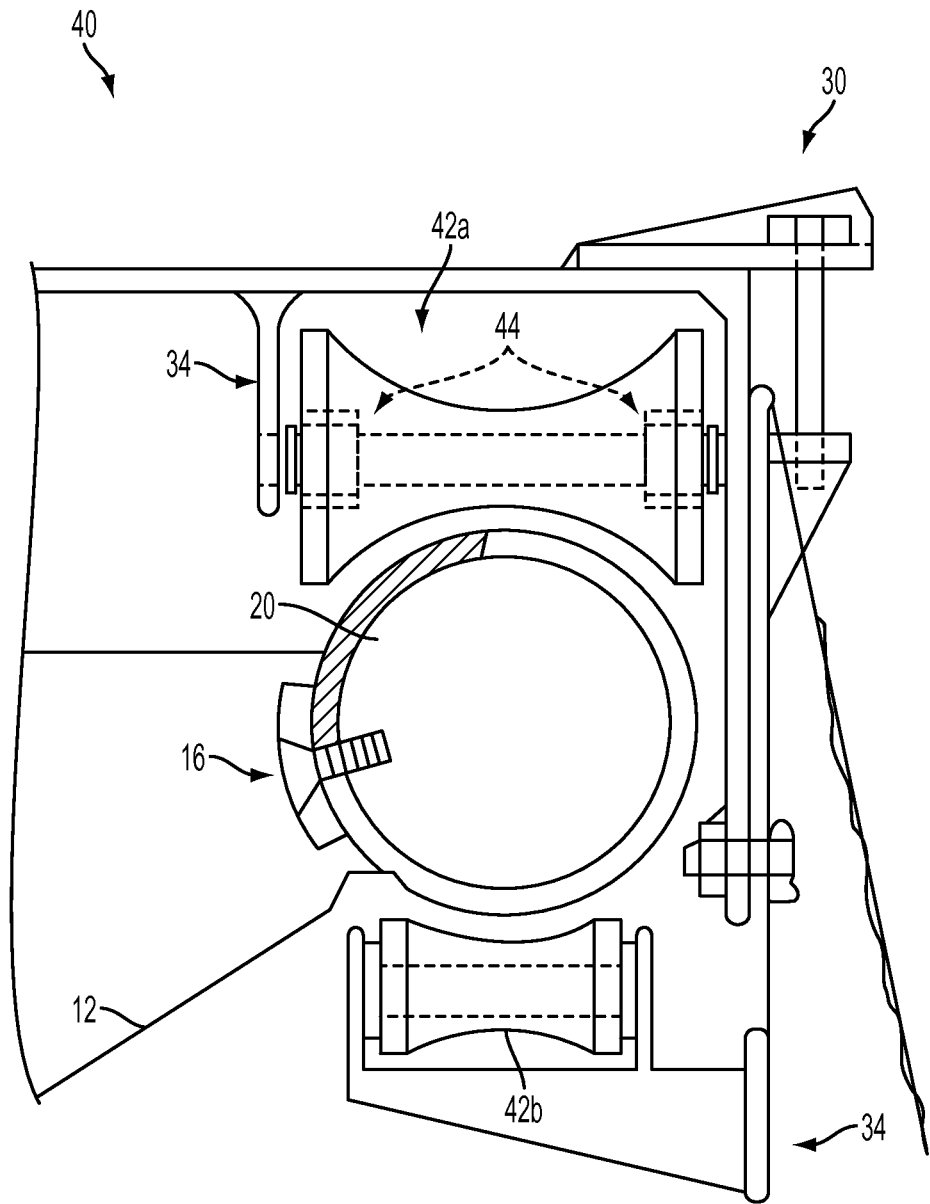
FIG. 6 shows a cross-section of one embodiment of a roller assembly on a tubular track.

FIG. 6 shows an embodiment of the roller assembly 40. It is secured to the platform mounting bracket 30 at interface 34. The roller assembly comprises two rollers 42a and 42b, which are shown to roll over a tubular track 20. Roller 42a may be equipped with thrust bearings 44 to withstand the abrupt thrusts of wind at a high altitude. The track 20 is secured to the tower mounting bracket 12 at interface 16.

FIG. 7 shows another embodiment of the roller assembly 40. It is secured to the platform mounting bracket 30 at interface 34. This embodiment of the roller assembly comprises three rollers—a primary vertical roller 42c, a lateral roller 42d, and a bottom roller 42e, which are shown to roll over a track 20. In this embodiment, track 20 is shown to have an "H-" or "I-" shaped cross-section. In places with very high wind velocity, or places that have frequent changes in wind direction, a highly stable mounting platform and a smooth rotation would be necessary. The embodiment of the roller assembly and track shown in this figure is particularly suitable to produce a smooth, continuous, rotational movement. The track 20 is secured to the tower mounting bracket 12 at interface 16. The platform 50 is shown fixed to the platform mounting bracket.

It should be noted that when track 20 is shaped substantially like a closed curve, such as an ellipse or a circle, then the track segments will induce some discontinuity at the junctures where two track segments are joined end to end, as depicted in FIGS. 3 and 4. In such cases, the number of roller assemblies may be taken to be one more than the number of track segments. This will ensure that the roller assembly will always be in contact with track 20, thereby removing the possibility of a derailment, or the possibility of the rollers getting stuck in the splices.

Figure 8:
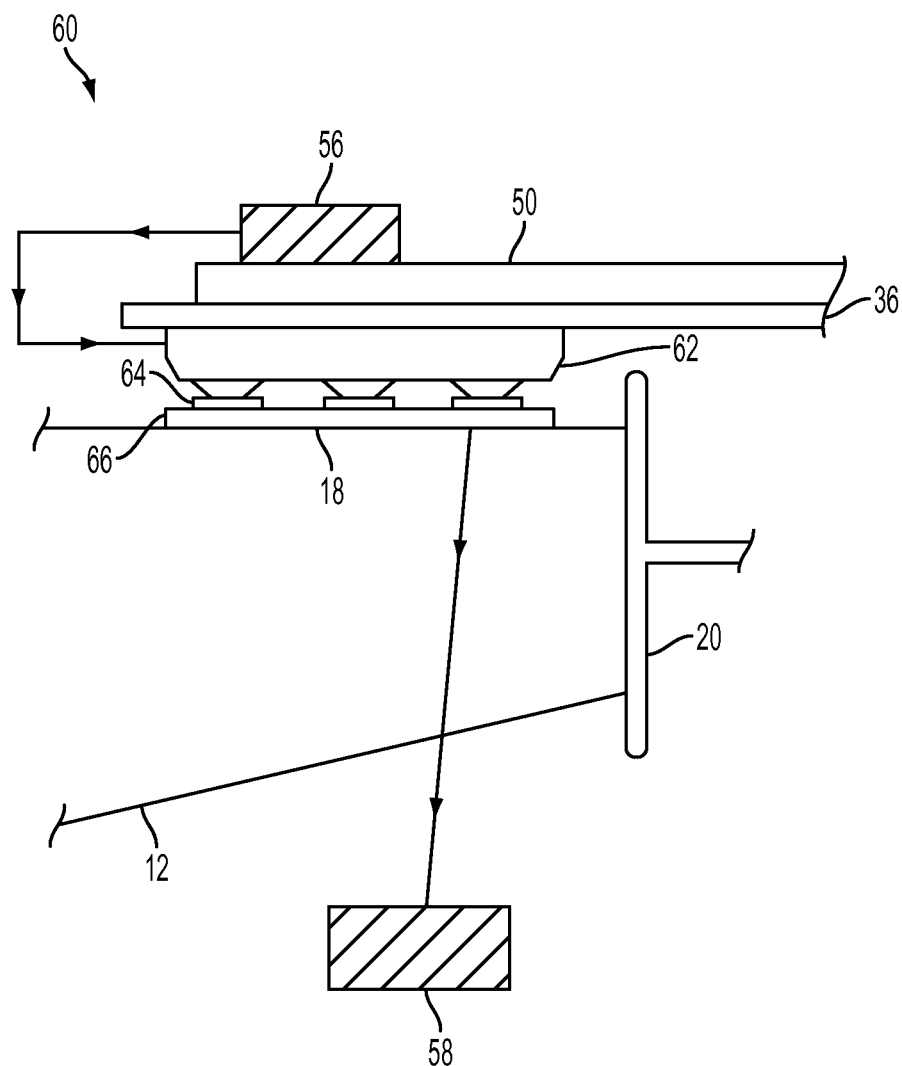
FIG. 8 shows a schematic view of one possible arrangement of the slip ring assembly.
Figure 9:
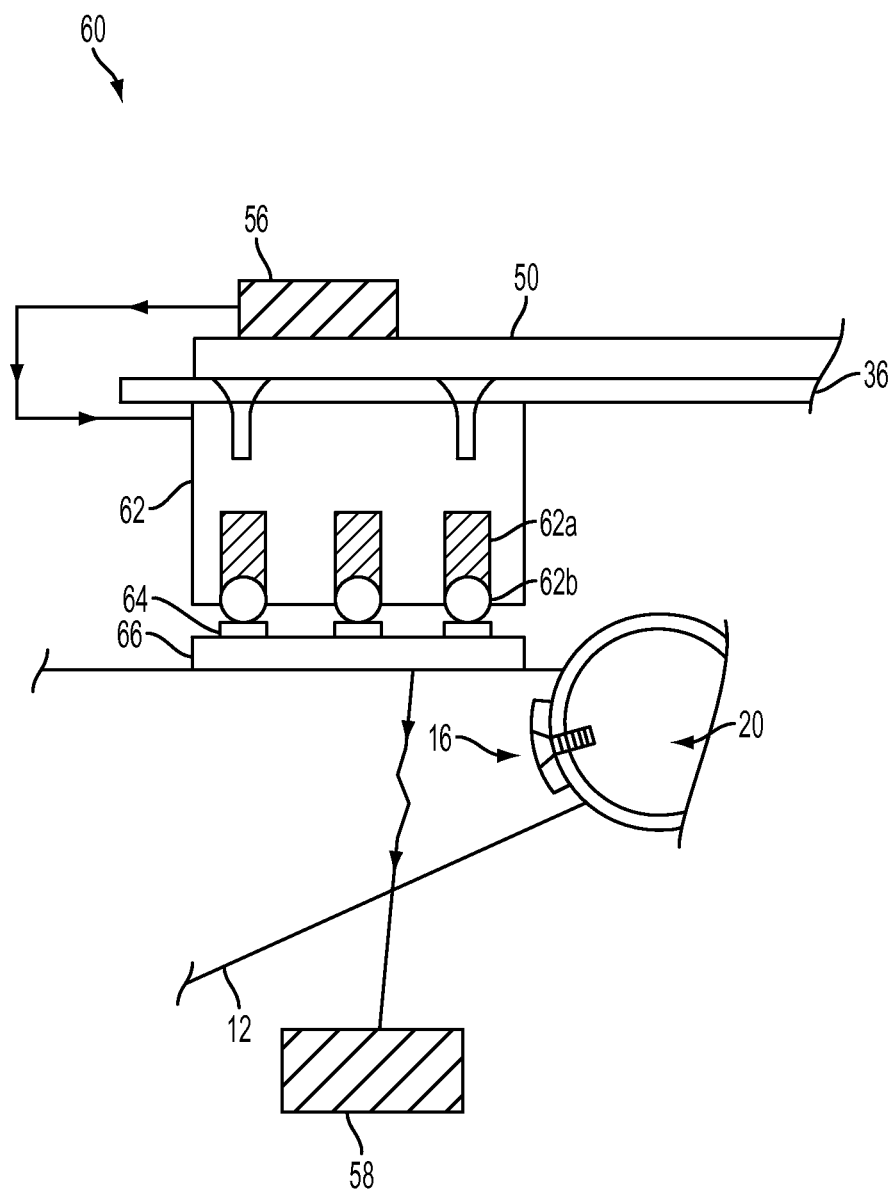
FIG. 9 shows a detailed cross-section of one possible arrangement of the slip ring assembly.

FIGS. 8 and 9 show schematic views of one possible arrangement of the slip ring assembly 60. In both figures, the slip ring assembly 60 comprises a slip ring rotor 62, a slip ring stator 64, and a slip ring track 66. The slip ring rotor 62 is secured to the platform mounting bracket at interface 36. The slip ring stator is 64 is secured to the slip ring track 66. The slip ring track 66 may in turn be attached to the tower mounting bracket 12 at interface 18. A portion of track 20 and platform member 50 are shown to represent relative positions of the elements. To facilitate a continuous flow of electricity or electronic signals, we may connect the slip ring rotor 62 to a rotational unit 56, and we may connect the slip ring stator 64 to a stationary unit 58. In the case of a wind power generation system, the rotating unit would be a wind turbine with a generator. In the case of a cellular transmission system, or a radio and television signal transmission or receiving system, the rotating unit could carry an antenna while the transmitter and receiver circuitry could mount on the stationary unit. In FIG. 9 we show how the slip ring rotor 62 may comprise of electrical brushes 62a and ball-bearings 62b. The ball-bearings roll over the slip ring stator 64, which in turn is attached to the slip ring track 66.

It may be noted that the track 20 may also be used as a slip ring track as long as it is made of suitable conducting material.

Figure 10:
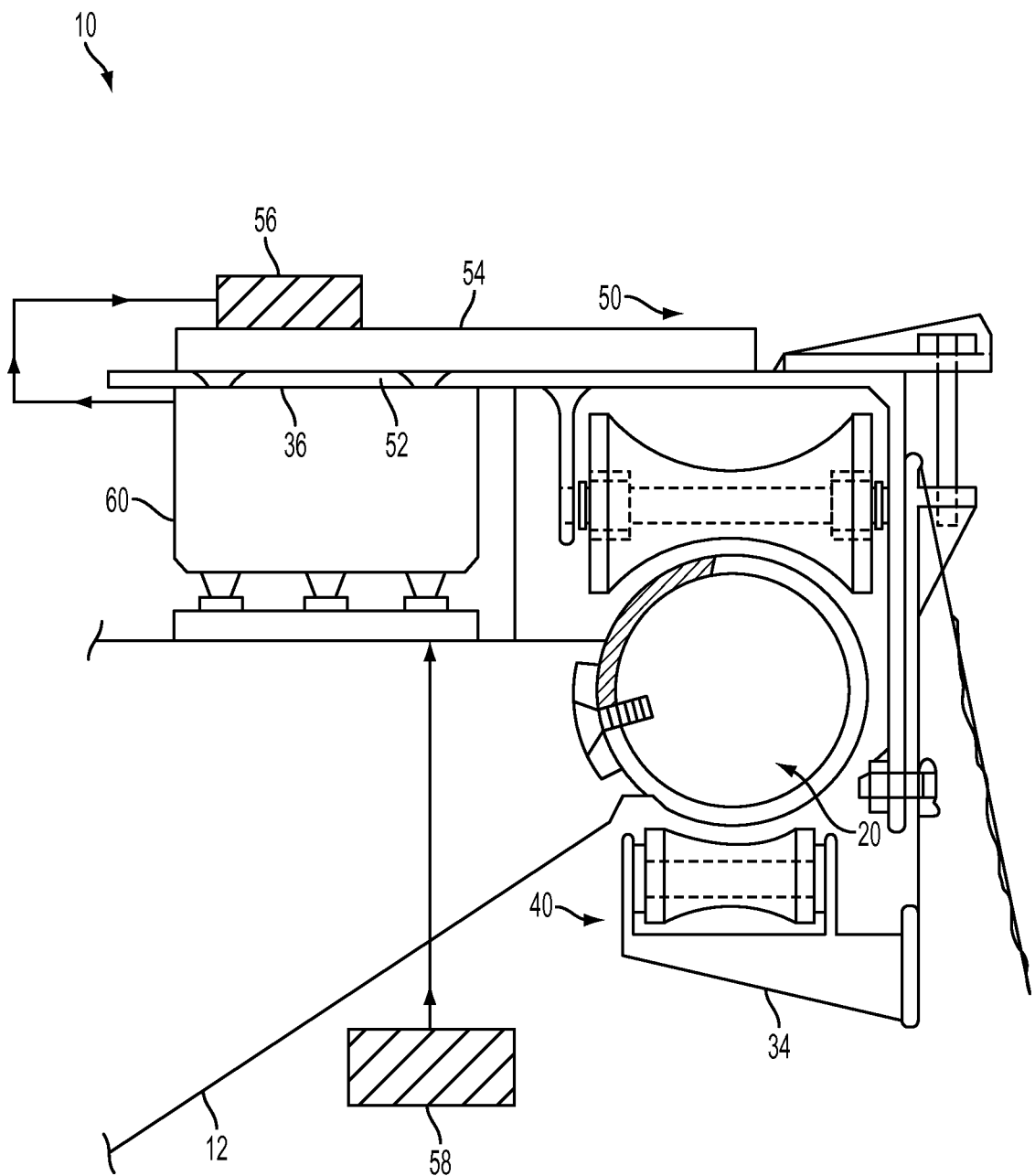
FIG. 10 is a view of the tower mounting apparatus showing a cross-section of one embodiment of a roller bracket assembly and a slip ring assembly.
Figure 11:
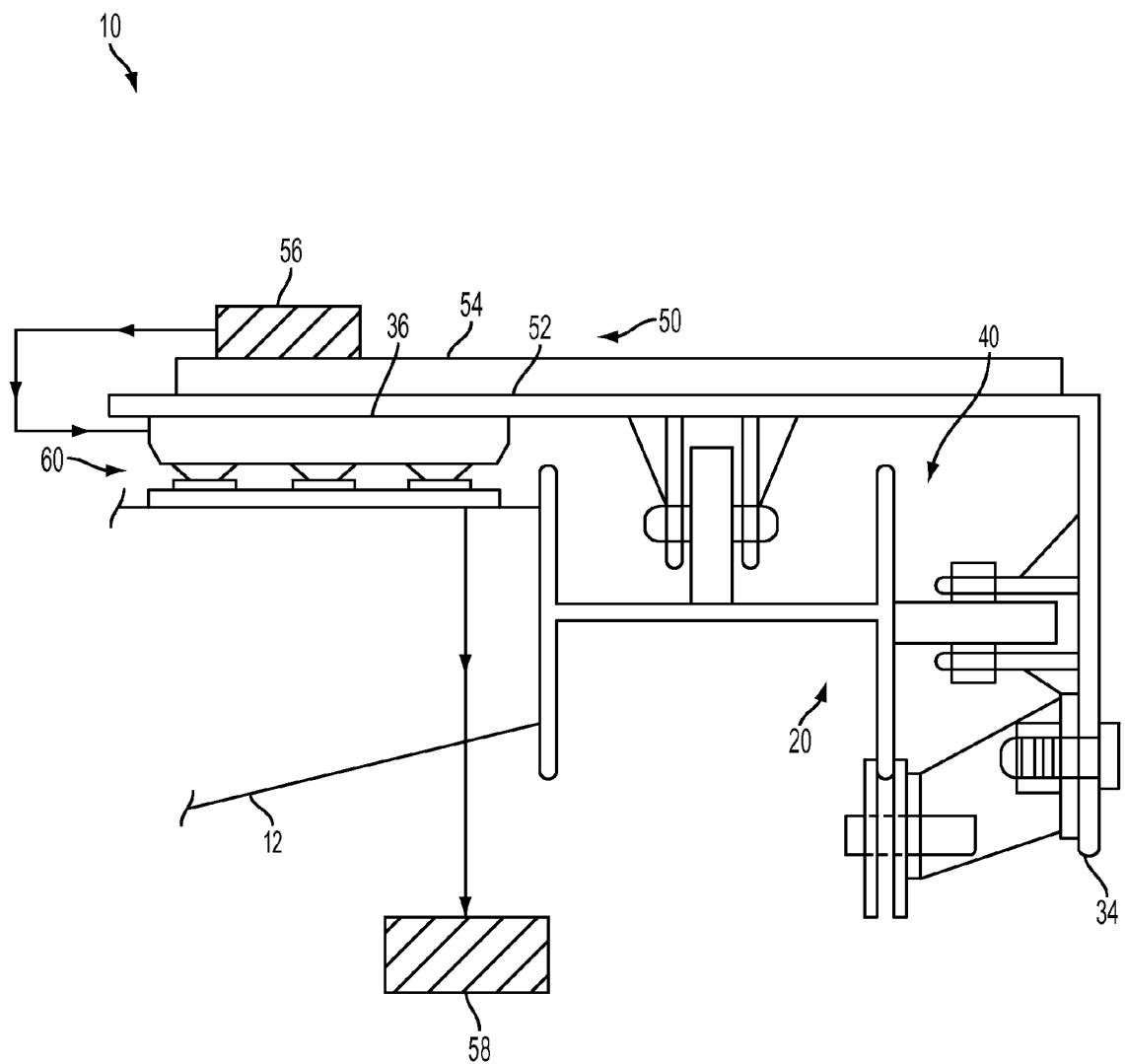
FIG. 11 is a view of the tower mounting apparatus showing a cross-section of another embodiment of a roller bracket assembly and a slip ring assembly.

FIGS. 10 and 11 show two different embodiments of the tower mounting apparatus 10. Track 20 is secured to the tower mounting bracket 12. A roller assembly 40 is secured to the platform mounting bracket at interface 34. The stationary part of the slip ring assembly 60 is secured to the tower mounting bracket 12, while the rotating part of the slip ring assembly 60 is secured to the platform mounting bracket at interface 36. The under-surface 52 of the platform segment 50 is mounted onto the platform mounting bracket, while the top-surface 54 of the platform segment 50 may hold the stationary unit 56 of a device or system.

It may be noted that the mounting apparatus of the present invention may be pre-installed onto new towers before the towers are placed in position. However, the importance of the invention lies in the fact that it can be installed onto existing towers. Thus, the track segments 20 and the platform segments 50 may be mounted piece-by-piece. In some embodiments, the construction described here will allow the assembly of tracks that form substantially closed curves, such as elliptical or circular curves, that completely surround a tower. The roller assemblies will facilitate free rotation around the tower.

However, it may also be noted that when appropriate, a rotation of less than 360-degrees is also allowed. Furthermore, a plurality of the track segments, roller assemblies and platform segments may be installed onto a single tower, stacked vertically. This is constrained by the weight capacity of the tower, and its ability to withstand wind gusts.

It may also be noted that although the embodiments are described using a lattice-type tower, any tower may be used, including a monopole tower. Towers installed on floating platforms, or other towers designed to float are also included within the scope of this invention. Similarly, towers that are designed to be used in space are also included within the scope of this invention.

It may also be noted that a variety of wind turbines may be mounted on such a tower mounting apparatus. Such wind turbines would certainly include vertical and horizontal axis turbines. Similarly, a large variety of other devices may be mounted onto the platform, such as cellular communication devices, or devices that transmit, receive and transfer television and radio signals. Solar panels may also be mounted onto these platforms.

The wind turbine itself may have a fixed vertical axis, a fixed horizontal axis, or a variable axis.

While many novel features have been described above, the invention is not limited to these physical embodiments. It is described and illustrated with particularity so that that those skilled in the art may understand all other embodiments that may arise due to modifications, changes in the placement of the relative components, omissions and substitutions of the embodiments described herein, that are still nonetheless within the scope of this invention. Therefore, the scope of the invention is intended to be limited solely by the scope of the appended claims.

I claim:

1. A mounting apparatus for mounting devices or systems onto a tower, comprising:
    tower mounting brackets;
    track members;
    roller assemblies;
    platform mounting brackets;
    a slip ring assembly, and
    platform members;
        wherein each said tower mounting bracket has a first mounting interface and a second mounting interface;
        wherein each said tower mounting bracket is adapted to be releasably secured to said tower at said first mounting interface;
        wherein each said track member is adapted to be releasably secured to a tower mounting bracket at the second mounting interface of that tower mounting bracket;
        wherein each said platform mounting bracket has a first mounting interface and a second mounting interface;
        wherein each said roller assembly is releasably secured to a platform mounting bracket at the first mounting interface of that platform mounting bracket;
        wherein each said platform member is releasably secured to said platform mounting bracket at the second mounting interface of that platform mounting bracket;
        wherein each said roller assembly is configured to roll on said track members;
        wherein said device or system is mounted onto said platform member;
    said slip ring assembly providing a continuous electrical connection with said device or system.

2. The mounting apparatus of claim 1, wherein said slip ring assembly comprises:
    a slip ring track;
    a slip ring rotor; and
    a slip ring stator;
        wherein each said tower mounting bracket comprises a third mounting interface and said slip ring track is releasably secured to said tower mounting brackets at said third mounting interface of said tower mounting brackets;
        wherein each said platform mounting bracket comprises a third mounting interface and said rotor is releasably secured to said platform mounting brackets at said third mounting interface of said platform mounting brackets;
        wherein said stator is releasably secured to said slip ring track.

3. The mounting apparatus of claim 1, wherein:
the number of said platform segments is at most the number of said roller assemblies.

4. The mounting apparatus of claim 1, wherein said roller assembly comprises:
    a primary vertical roller;
    a lateral roller; and
    a bottom roller.

5. The mounting apparatus of claim 1, wherein:
said track members lie in one or more planes;
    wherein said one or more planes are substantially perpendicular to the longitudinal axis of said tower.

6. The mounting apparatus of claim 5, wherein:
said track members join together to form a single track in said one or more planes.

7. The mounting apparatus of claim 6, wherein:
said single track is a substantially closed curve that encircles said tower.

8. The mounting apparatus of claim 7, wherein:
said roller assemblies are freely rotatable on said track.

9. The mounting apparatus of claim 7, wherein:
the number of said roller assemblies is one more than the number of said track segments.

10. The mounting apparatus of claim 1, wherein:
said device is a wind turbine.

11. The mounting apparatus of claim 10, wherein:
said wind turbine is a fixed-axis turbine.

12. The mounting apparatus of claim 11, wherein:
said wind turbine has a fixed horizontal axis.

13. The mounting apparatus of claim 11, wherein:
said wind turbine has a fixed vertical axis.

14. The mounting apparatus of claim 10, wherein:
said wind turbine is a variable-axis turbine.

15. The mounting apparatus of claim 1, wherein:
said system is a cellular communication system.

16. The mounting apparatus of claim 1, wherein:
said system receives, transmits, or transfers radio signals.

17. The mounting apparatus of claim 1, wherein:
said system receives, transmits, or transfers television signals.

18. The mounting apparatus of claim 1, wherein:
said system is a solar array.

19. The mounting apparatus of claim 1, wherein:
said apparatus is mounted onto a lattice-type tower.

20. The mounting apparatus of claim 1, wherein:
said apparatus is mounted onto a monopole tower.

21. The mounting apparatus of claim 1, wherein:
said apparatus is mounted onto a floatable tower.

\* \* \* \* \*